United States Patent [19]

Helfrich, Jr.

[11] 4,226,355
[45] Oct. 7, 1980

[54] ICE CREAM HOLDER

[75] Inventor: Fred H. Helfrich, Jr., St. Louis County, Mo.

[73] Assignee: Thomas P. Madden, St. Louis, Mo.; a part interest

[21] Appl. No.: 39,812

[22] Filed: May 17, 1979

[51] Int. Cl.³ .............................................. B65D 3/06
[52] U.S. Cl. ........................... 229/1.5 H; 229/DIG. 7; 426/139; 426/95; 426/132
[58] Field of Search ................ 229/1.5 H, DIG. 7; 426/139, 95, 132

[56] References Cited
U.S. PATENT DOCUMENTS

| 1,616,570 | 2/1927 | Boynton | 229/1.5 H |
|---|---|---|---|
| 1,794,238 | 2/1931 | McKibben | 426/139 |
| 1,800,759 | 4/1931 | Shean | 229/1.5 H |
| 1,938,113 | 12/1933 | Schoenfeld | 426/139 |
| 2,046,729 | 7/1936 | Denaro | 426/139 |
| 2,159,761 | 5/1939 | Fredrickson | 426/139 |
| 2,321,519 | 6/1943 | Rubinoff | 229/1.5 H |
| 2,697,041 | 12/1943 | Graham | 426/139 |
| 2,948,452 | 8/1960 | Grogam et al. | 229/1.5 H |
| 3,306,512 | 2/1967 | Pagnini | 229/1.5 H |

Primary Examiner—Davis T. Moorhead
Attorney, Agent, or Firm—Senniger, Powers, Leavitt and Roedel

[57] ABSTRACT

An ice cream holder for insertion in an ice cream cone comprising a thin-wall member of generally funnel shape and open at each of its ends. The member has a first relatively narrow lower portion which extends down into the cone and fits snugly therein and an upper portion flaring outwardly from the lower portion forming a relatively wide open-mouth receptacle at the top of the cone for receiving ice cream therein. The outwardly flaring portion of the member forming the receptacle is inclined inwardly and downwardly from the periphery thereof toward the lower portion of the member in the cone whereby melting ice cream is funneled down into the cone.

12 Claims, 5 Drawing Figures

U.S. Patent
Oct. 7, 1980
4,226,355
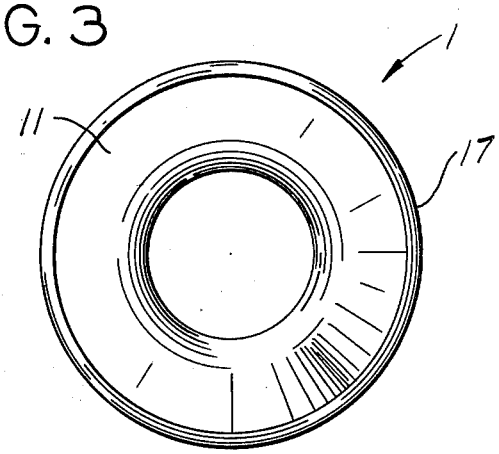
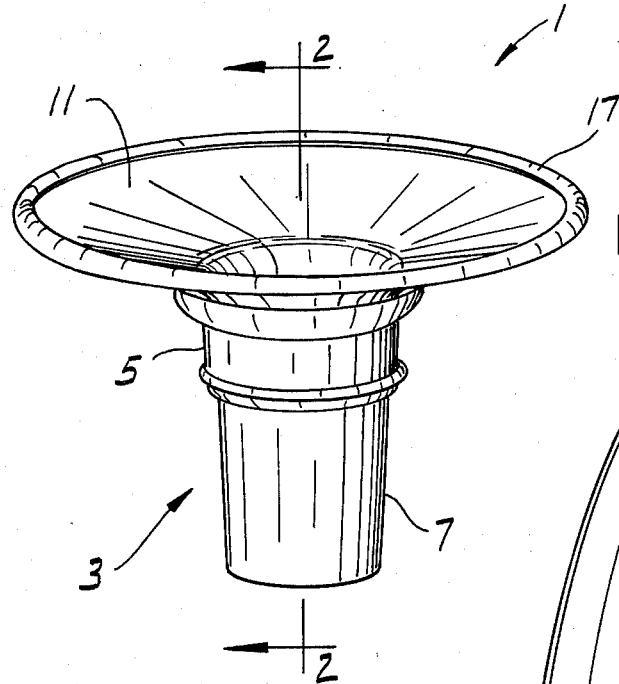
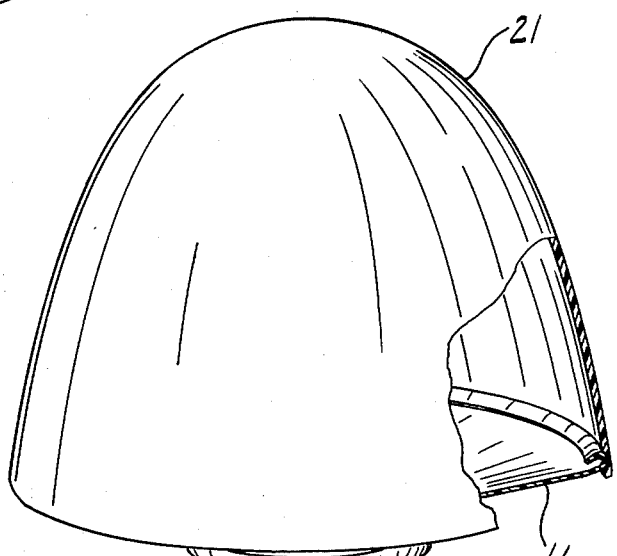
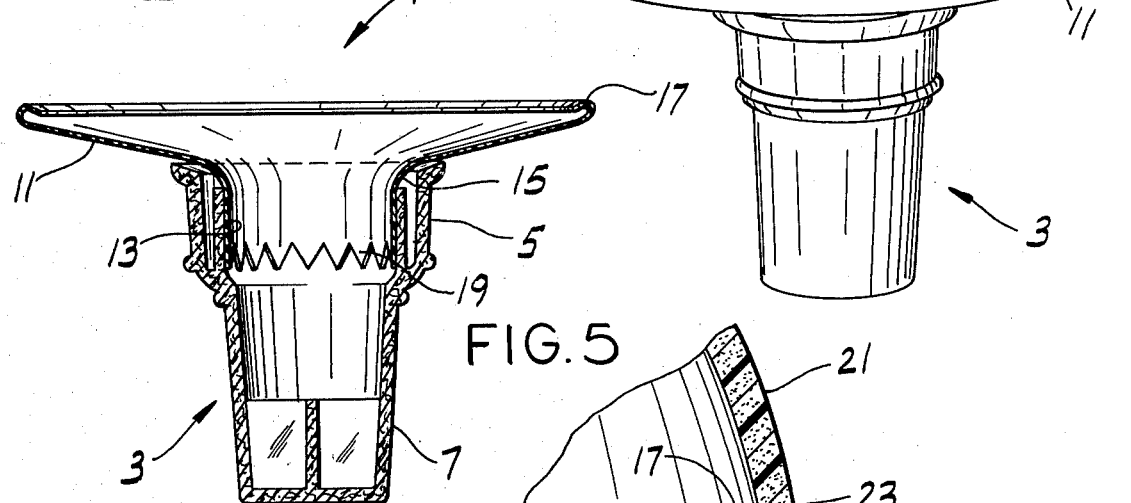
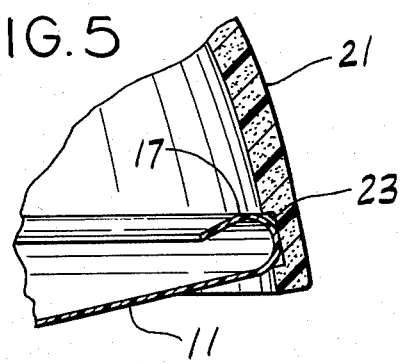

ICE CREAM HOLDER

BACKGROUND OF THE INVENTION

This invention relates generally to ice cream holders and more particularly to an improved holder which is adapted to fit inside the upper end of a conventional edible cone for directing melting ice cream down into the cone.

To prevent melted ice cream from running down on the outside of the cone and onto the hand (or clothing) of the person eating the cone, various types of drip-catching devices have heretofore been used. U.S. Pat. Nos. 2,321,519, 2,948,452 and 3,306,512 disclose several such devices, each of which is shown as being fitted on the outside of a cone a considerable distance below the top of the cone. However, such outside-fitting devices are generally unsatisfactory in that melted ice cream can run down the outside of the cone and leak between the guard and the cone down onto the hand of the person eating the cone. Moreover, the portion of the cone immediately above the bottom of the device tends to soften and weaken due to the melted ice cream collected in the device and encircling the cone at that level. Reference may also be made to U.S. Pat. Nos. 2,697,041, 2,159,761, 2,046,729, 1,938,113 and 1,794,238 disclosing various ice cream cones and related accessory items.

SUMMARY OF THE INVENTION

Among the several objects of this invention may be noted the provision of an improved ice cream holder which fits into the upper end of the cone (rather than on the outside of the cone) and which directs melted ice cream down into the cone; the provision of such a holder which fits snugly and securely inside a cone; the provision of such a holder which allows the cone to be converted into a sundae; the provision of such a holder which is economical to produce; the provision of a cover for use in conjunction with the aforesaid holder for enclosing the ice cream at the upper end of a cone thereby to reduce melting of the ice cream and to shield it; and the provision of such a cover which may be readily and securely applied to the holder of this invention.

Generally, an ice cream holder of this invention is adapted to be inserted into an ice cream cone and comprises a thin-wall member generally of funnel shape and open at each of its ends. This member has a first relatively narrow lower portion adapted to extend down into the cone and to fit relatively snugly therein, and an upper portion flaring upwardly and outwardly from the lower portion forming a relatively wide open-mouth receptacle which extends over the upper edges of the cone and laterally outwardly beyond the cone for receiving ice cream therein. The outwardly flaring portion of the member forming the receptacle is inclined inwardly and downwardly from the periphery thereof toward the lower portion whereby with the lower portion in the cone melting ice cream is funneled down into the cone. Other objects and features will be in part apparent and in part pointed out hereinafter.

BRIEF DESCRIPTION OF THE DRAWINGS

FIG. 1 is a perspective of an ice cream holder of this invention as fitted into a conventional ice cream cone;

FIG. 2 is a vertical section on line 2—2 of FIG. 1;

FIG. 3 is a plan of FIG. 1;

FIG. 4 is as view similar to FIG. 1 showing an optional feature (i.e., a cover) of this invention, portions being broken away to illustrate details; and FIG. 5 is an enlarged portion of FIG. 4 illustrating the fit of the cover on the holder.

Corresponding reference characters indicate corresponding parts throughout the several views of the drawings.

DESCRIPTION OF A PREFERRED EMBODIMENT

Referring now to the drawings, and first more particularly to FIGS. 1–3, an ice cream holder of this invention is designated in its entirety by the reference numeral 1 and is shown inserted in the upper end of a conventional ice cream cone 3. For purposes of illustration, the cone shown in the drawings is of the type comprising an upper relatively short cylindrical section 5 and a lower section 7 generally frustoconical in shape, but it will be understood that the holder may also suitably be used with other types of cones, such as the type having a conical surface converging down to a point.

The ice cream holder 1 is constituted by an integrally-formed thin-wall plastic member generally of funnel shape, being open at each of its ends, i.e., its top and bottom. As shown best in FIG. 2, the holder is symmetrical about its central vertical axis and has upper and lower portions desginated 11 and 13, respectively, both of which are generally circular in horizontal section. The lower portion 13, which is relatively narrow and cylindric in shape, extends down in the upper section 5 of the cone and is sized to fit relatively snugly therein in a manner which will be explained in more detail hereinafter. The upper portion 11 of the holder flares upwardly and outwardly from the lower portion 13 over the upper edges of the cone laterally outwardly beyond the cone, the transition between the upper and lower portions 13, 11 being a smooth-curve transition as indicated at 15. As viewed from the top (FIG. 3), the upper portion 11 of the holder is generally annular in shape and forms a relatively shallow open-mouth circular receptacle or dish at the top of the cone for receiving a scoop or scoops of ice cream therein. Inasmuch as the upper outwardly-flaring portion 11 of the holder is inclined inwardly and downwardly from the periphery thereof toward the lower portion 13 of the holder, all melting ice cream is funneled down into the cone, thereby eliminating the problem of melted ice cream running down the sides of the cone and onto the hand of the person eating the cone. A circular rim comprising an inwardly-turned lip 17 at the periphery of the upper portion 11 of the holder ensures that any melted ice cream dripping down onto the upper surface of the upper portion of the holder is contained in the holder.

It will be observed that the upper portion 11 of the holder is sufficiently wide (e.g., 5 inches) at its rim to accomodate several scoops of ice cream placed side-by-side in the holder. This enables the cone to be converted into what is, in effect, a sundae, with suitable topping, syrup, nuts, whipped cream, etc. being placed over the ice cream.

As mentioned hereinabove, the lower cylindric portion 13 of the holder is sized for a relatively snug fit in the upper end section 5 of the cone, thereby ensuring that the holder remains securely in place in the cone. In this connection, it will also be noted that the bottom edge of the lower portion 13 of the holder is serrated, as indicated at 19. This further ensures the securement of the holder in the cone in that it enables ice cream in the lower portion of the holder frictionally to engage the sides of the cone in the open areas between the serrations so as to assist in preventing the holder from slipping out of the cone.

Referring now to FIGS. 4 and 5 of the drawings, a dome-shaped cover adapted for use with the ice cream holder 1 hereinabove described is indicated at 21. As shown, this cover is generally in the form of a downwardly-opening inverted cup and is preferably of a suitable insulative material (e.g., styrofoam) so that when it is placed on the holder over the ice cream therein, it insulates the ice cream and reduces melting. It also shields the ice cream from dust, dirt and the like.

As shown, the cover 21 is rounded and convergent from its bottom to its top, and has a circular groove 23 formed therein at its bottom margin on the inside of the cover. The dimension across the bottom edge of the cover at the open end thereof is slightly greater than the dimension across the upper portion 11 of the holder at its rim. Thus the cover may be readily applied to the holder by placing it on the holder with the upper portion 11 of the holder received inside the open end of the cover, and by pushing the cover down on the holder until the lip 17 of the holder snaps into the groove 23 in the cover to snap-fasten the cover to the holder.

In view of the above, it will be seen that the several objects of the invention are achieved and other advantageous results attained.

As various changes could be made in the above constructions without departing from the scope of the invention, it is intended that all matter contained in the above description or shown in the accompany drawings shall be interpreted as illustrative and not in a limiting sense.

What is claimed is:

1. An ice cream holder adapted to be inserted in an ice cream cone comprising a thin-wall member of generally funnel shape and open at each of its ends, having a first relatively narrow lower portion adapted to extend down into the cone and to fit relatively snugly therein, and an upper portion flaring outwardly from said lower portion and forming a relatively wide open-mouth receptacle adapted to extend over the upper edges of the cone and laterally outwardly beyond the cone for receiving ice cream therein, the outwardly-flaring portion of said member forming said receptacle being inclined inwardly and downwardly from the periphery thereof toward said lower portion whereby with the lower portion in the cone melting ice cream is funneled down into the cone.

2. An ice cream holder as set forth in claim 1 wherein said outwardly-flaring upper portion of said member has an inwardly-turned lip at its periphery.

3. An ice cream holder as set forth in claim 1 wherein said outwardly-flaring upper portion of said member has a generally circular rim at its periphery.

4. An ice cream holder as set forth in claim 3 wherein said rim comprises an inwardly-turned lip.

5. An ice cream holder as set forth in claim 1 wherein and said upper portion of said member is in the form of a relatively shallow circular dish.

6. An ice cream holder as set forth in claim 1 wherein said member is generally symmetrical about its central vertical axis and the upper and lower portions of said member are generally circular in horizontal section.

7. An ice cream holder as set forth in claim 1 wherein said member is an integrally-formed plastic member.

8. An ice cream holder as set forth in claim 1 wherein the lower portion of said member is formed with open areas for enabling ice cream in the lower portion of the member frictionally to engage the inside of the cone.

9. An ice cream holder as set forth in claim 8 wherein the bottom edge of the lower portion of said member is serrated, with said open areas being betwen adjacent serrations.

10. In combination with the ice cream holder set forth in claim 1, a cover adapted to interfit with said upper portion of said member for covering ice cream in the member.

11. A combination as set forth in claim 10 wherein said cover is in the form of a downwardly-opening inverted cup, the dimension across the bottom of the cover at the open end of the cover being greater than the dimension across said member at the upper end thereof thereby enabling the cover to be placed on said member with the upper portion thereof received in the open end of the cover, the cover being convergent from its bottom to its top and being formed for snap-fastening of the cover on said member when the cover is pushed down on the latter.

12. A combination as set forth in claim 11 wherein said cover has a groove therein at the bottom of the cover around the inside of the cover, the periphery of the upper portion of said member being adapted to snap into said groove when the cover is pushed down on said member thereby to secure the cover to the member.

* * * * *